Dec. 18, 1928.

D. D. HUYETT 1,696,121

WIRE FOLDING AND CUTTING MACHINE

Filed Aug. 4, 1925     7 Sheets-Sheet 1

Fig. 1.

Inventor
Daniel D. Huyett,
By Samuel Herrick
Attorney

Fig. 2.

Dec. 18, 1928. 1,696,121
D. D. HUYETT
WIRE FOLDING AND CUTTING MACHINE
Filed Aug. 4, 1925 7 Sheets-Sheet 3

Fig. 3.

Inventor
Daniel D. Huyett,
By Samuel Hernick,
Attorney

Dec. 18, 1928.  
D. D. HUYETT  
1,696,121  
WIRE FOLDING AND CUTTING MACHINE  
Filed Aug. 4, 1925  
7 Sheets-Sheet 4

Fig. 4.

Inventor  
Daniel D. Huyett,  
By Samuel Herrick,  
Attorney

Dec. 18, 1928.  1,696,121

D. D. HUYETT

WIRE FOLDING AND CUTTING MACHINE

Filed Aug. 4, 1925  7 Sheets-Sheet 5

Inventor
Daniel D. Huyett,
By Samuel Herrick,
Attorney

Inventor
Daniel D. Huyett,
By Samuel P. Hernick,
Attorney

Dec. 18, 1928.  1,696,121
D. D. HUYETT
WIRE FOLDING AND CUTTING MACHINE
Filed Aug. 4, 1925  7 Sheets-Sheet 7

Inventor
Daniel D. Huyett,
By Samuel Herrick,
Attorney

Patented Dec. 18, 1928.

1,696,121

UNITED STATES PATENT OFFICE.

DANIEL D. HUYETT, OF WILMINGTON, DELAWARE, ASSIGNOR TO ATLAS POWDER COMPANY, OF WILMINGTON, DELAWARE, A CORPORATION OF DELAWARE.

WIRE FOLDING AND CUTTING MACHINE.

Application filed August 4, 1925. Serial No. 48,108.

The primary purpose of the present invention is to provide a machine for folding into suitable bundles, for shipment and handling, the pairs of insulated wires, commonly attached to electric detonators and which pairs of wires connect such detonators to the "leading wires" which run from the blasting machine and which may have quite a number of detonators attached to them, for simultaneous explosion. The length of wire in the bundles varies between certain desired limits, also the overall length of the bundles is varied. One of the important purposes of the present invention is to provide a machine which will fold the wire with a figure 8 motion into a correspondingly shaped bundle, with each fold overlapping the other; thus making a bundle which will unfold easily in the field, without tangling. It is necessary to strip the insulation from the wire for about 2½ inches at the battery or blasting machine and for about ¼ of an inch at the other end, for attachment to the detonator. The machine of the present invention is adapted to automatically remove the insulation from the wires for the purpose indicated.

In operation, the machine folds the wire into bundles, measures off the required length for each bundle, cuts the wires and removes the insulation, for the proper distance, from the ends of said wires. The operator removes the finished bundle by hand, at the same time removing any loose insulation and twisting the loose battery ends around the bundle. Adjustments are provided for varying the length of wire per bundle and also for varying the length of the bundles.

One important object of the invention is to provide, in a machine of the character indicated, means for maintaining the wire under proper tension during the winding operation and for automatically relieving said tension after the winding operation is completed, thereby facilitating the ready removal of the bundles from the machine.

Further objects and advantages of the invention will be set forth in the detailed description which follows.

In the accompanying drawing.

Like numerals designate corresponding parts in all of the figures of the drawing.

Figure 6:
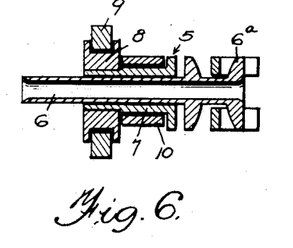
Fig. 6 is a vertical sectional view through the shuttle, hereinafter described.

The conducting and insulated wire is, when delivered for use at the machine, double wound, or wound in two parallel strands, upon a spool or reel. These two parallel strands of wire are fed from any suitable external tensioning means into the shuttle 5, of the machine. (See Figs. 1 and 6.) This shuttle comprises a tube 6, which passes through a sleeve 7, in which the tube 6, may have endwise movement. A sleeve 7, is carried by a cross-head 8, the latter engaging guides 9. Vertical movement along said guides is imparted to the cross-head and consequently to the shuttle, by means of a connecting rod 10, the lower end of which is pivotally connected at 11, to a crank 12, of gear wheel 13. The ways 9 are carried by and move bodily with a cross-head 14, that is slidable upon guide rods 15. Motion is imparted to the cross-head 14, by means of a connecting rod 16, having crank connection at 17, with gear wheel 18. This gear wheel meshes with a gear wheel 19, the latter meshing with the gear wheel 13. Motion is imparted to the gear wheel 13, from a motor 20, through pinion 21, gear 22, and pinion 23, the latter meshing with said gear 13. The ratio of the gears described is such that the cross-head 14, makes two strokes to each stroke of the cross-head 8, and shuttle 5, with the result that the wire is wound in figure 8 formation upon the receiving pins 24 and 25, of the turret discs 26 and 27. These discs are carried by a vertical shaft 28, to which a step by step movement is imparted by mechanism hereinafter described.

The purpose of mounting the tube 6, for endwise movement in the cross-head 8, is to permit outward movement or withdrawal of the shuttle, constituted by said tube and associated parts, to an extent sufficient to permit it to clear the wires of the wound bundle at the point of crossing of the same. This endwise movement or withdrawal is effected by providing a spool-like head 6ª, upon the tube 6, which is engaged with curved guide ways 29. These guide ways are connected at their upper ends by a block 30, with the upper ends of the ways 9, and they are connected at their lower ends to the cross-head 14, and ways 9, through the medium of a goose neck 32. Thus, all of the ways move bodily, laterally, with the cross-head 14, during the vertical reciprocation of the shuttle under the influence of the connecting rod 10, and this combined motion results in the formation of a figure 8 bundle, as previously stated. It is manifest that if the shuttle is permitted to make only a few vertical reciprocations before the turret is stepped forward to bring another pair of pins 24, 25, into wire receiving position, the length of wire in the wound bundle will be relatively short, while, if the turret is permitted to remain stationary during a longer period of time, so that the shuttle may make more vertical reciprocations before the turret is stepped forward, the length of wire in the bundle will be correspondingly increased. Therefore, this machine comprises means for varying the time at which the turret will be moved to thereby vary the length of wire in the bundle.

Figure 1:
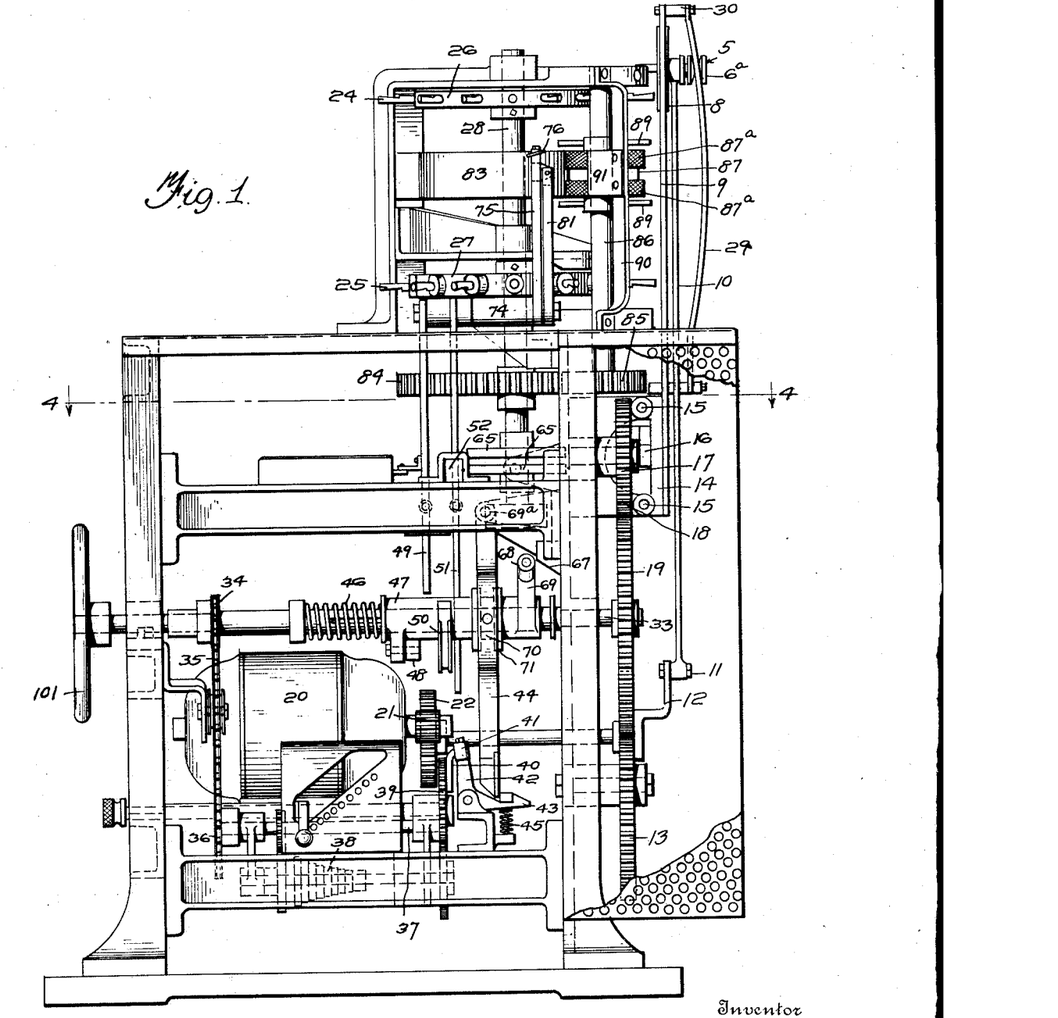
Fig. 1 is a side elevation of a machine embodying the invention.
Figure 2:
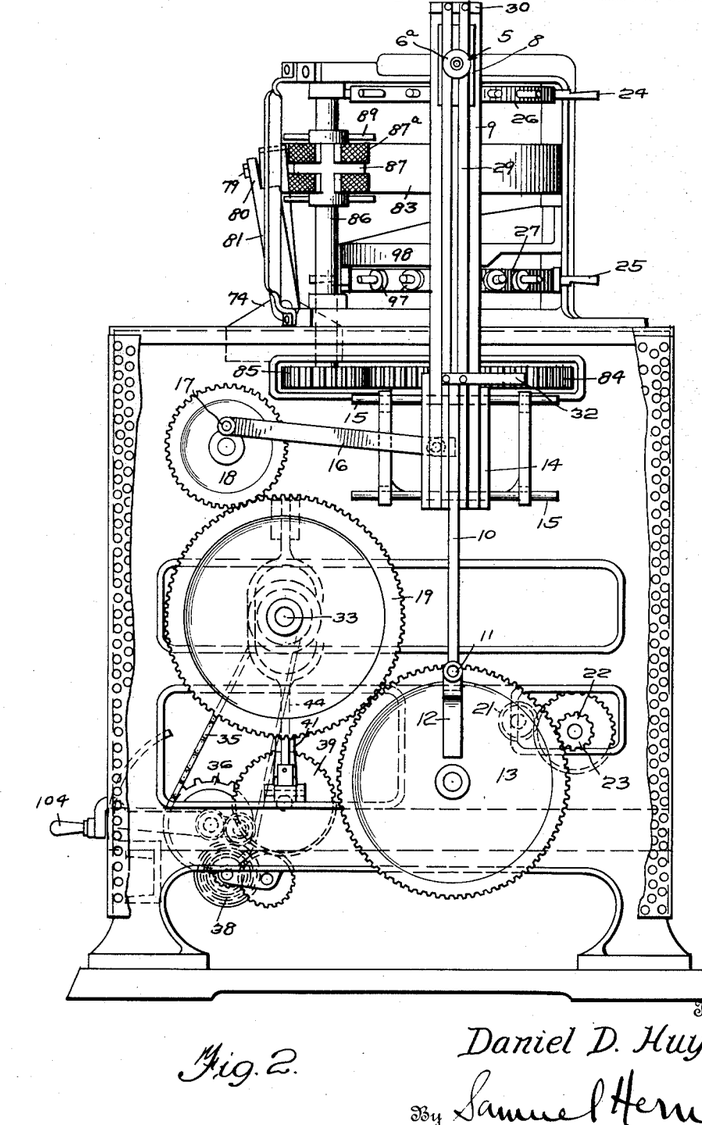
Fig. 2 is a view looking from one end thereof.
Figure 3:
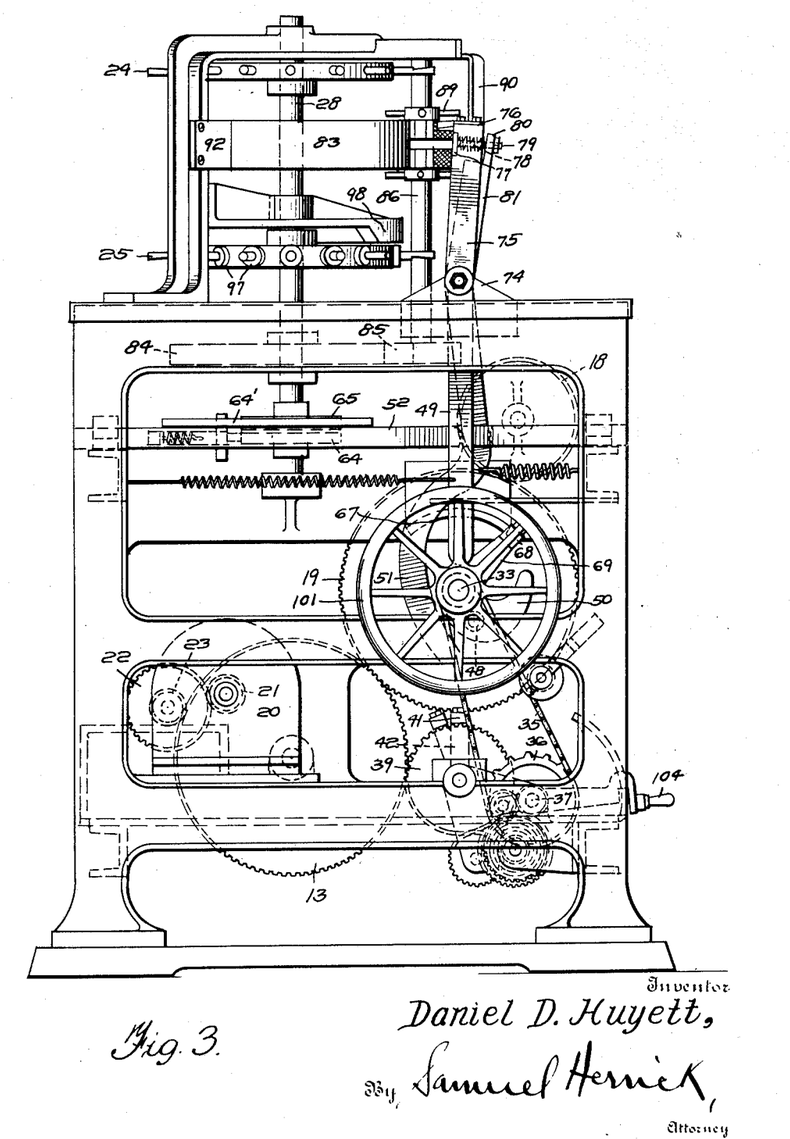
Fig. 3 is a view looking from the opposite end thereof.
Figure 4:
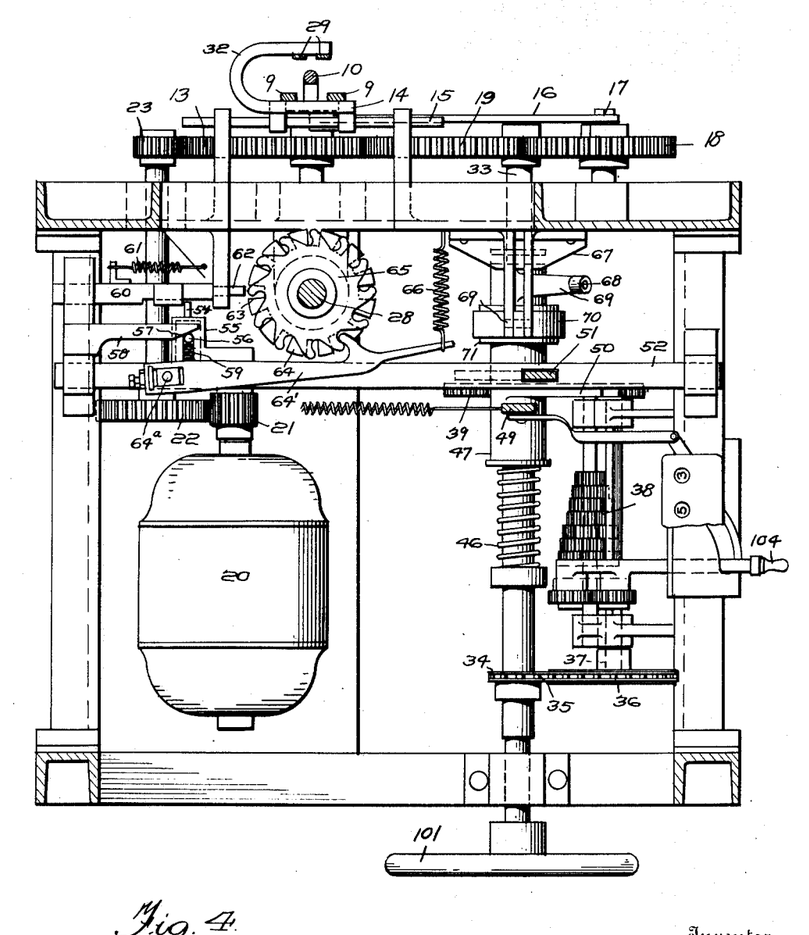
Fig. 4 is a horizontal sectional view upon line 4—4, of Fig. 1.
Figure 5:
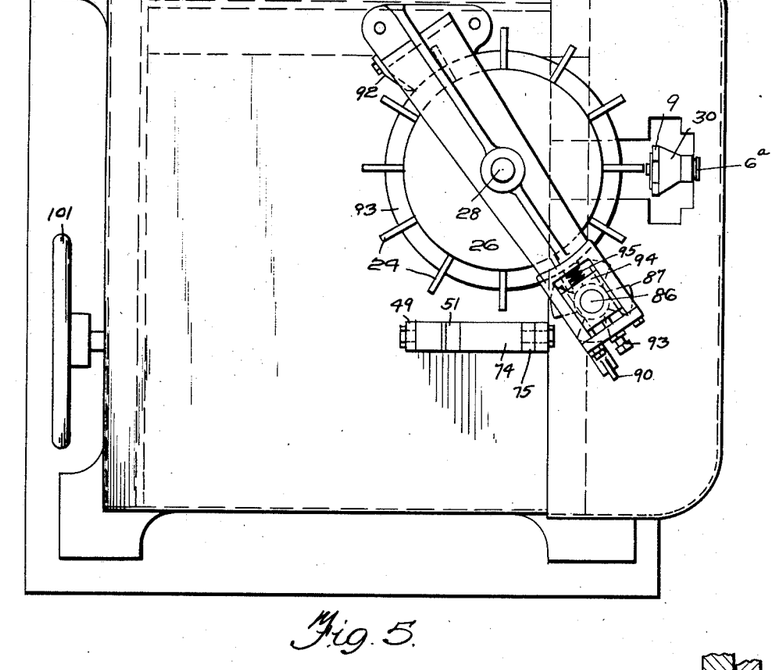
Fig. 5 is a plan view with certain of the parts removed.

By referring to Fig. 1, it will be seen that the gear wheel 19, is mounted upon a shaft 33. This shaft carries a sprocket wheel 34, which drives through chain 35, to a sprocket wheel 36, upon shaft 27. A change speed gearing is indicated in a general way at 38. This gearing will not be described in detail since it is of conventional form and is like that commonly employed upon lathes. It suffices to say that through its agency a gear wheel 39, may be variably driven from shaft 37. The gear wheel 39, carries a cam finger 40, which is adapted to contact with a roller 41, upon the end of a bell crank lever 42, to rock a dog or latch 43, downwardly, to disengage it from the lower end of a lever 44, the movement of the dog being against the tension of a spring 45. When the lever 44 is released by the dog, a spring 46, moves a sleeve 47, endwise upon the shaft 33. This sleeve is splined upon the shaft, so that it turns therewith, and when it is moved toward the right, under the influence of the spring 46, a contact roller 48, is brought into alignment with the lower end of a lever 49, and a cam 50, of the sleeve, is brought into alignment with the lower portion of a lever 51. This lever 51, passes through a bar 52. When the cam 50, rides over the lever 51, the bar 52, is moved endwise.

The initial movement of the bar 52, causes the withdrawal of a locking pin 54. This pin is mounted in a housing 55, carried by the bar 52, and is provided with an angular end 56, which acts against a cam face 57, of a plate 58, so that the pin 54, will be withdrawn against the tension of the spring 59, upon initial movement of the bar 52. This releases a lock bar 60, and permits a spring 61, to force the end 62, of the lock bar, into engagement with one of the notches 63, of a locking disc 64, which is fast upon the shaft 28. The continued movement of the bar 52, steps the turret forward to bring another pair of the pins 24, 25 into wire receiving position, this being effected by the engagement of a pawl 64', with the teeth of a ratchet wheel 65, that is fast upon the vertical shaft 28. The pawl 64', is connected to the bar 52, by a conventional type of adjustable pivot, indicate at 64ª, and by means of which limited adjustment of the pawl, with respect to the bar 52, may be effected. A spring 66, holds the pawl in engagement with the teeth of the ratchet wheel.

A cam 67, (see Fig. 1), is disposed in the path of movement of a roller 68, that is carried by an arm 69, of sleeve 47, and serves to move said sleeve to the left and against the tension of spring 46, preparatory to repeating the above described operation. The lever 44 is pivoted at 69ª, and a yoke 70, of said lever, is engaged with an annularly channeled portion 71, of the sleeve 47, in a manner common in mechanical constructions, so that when the sleeve is shifted toward the left the lever will be swung toward the left to bring its lower end into engagement with the dog 43. The lever 44 then acts to hold the sleeve in the position illustrated in Fig. 1, with roller 48, and cam 50, out of alignment with the levers 49, and 51, until the trip 40, again engages roller 41, to disengage the dog 43, from the lower end of the lever 44.

Figure 7:
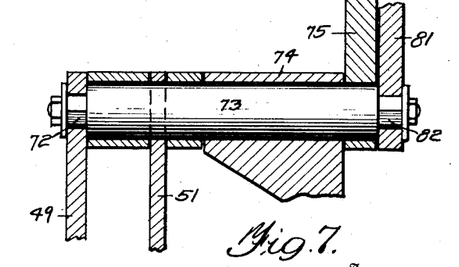
Fig. 7 is a vertical sectional view through a knife carrying shaft, and associated parts, hereinafter described.

The upper end of the lever 49 (see Fig. 7), is engaged with an angular portion 72, of a rock shaft 73, that is journaled in a suitable bearing 74. The lever 51, has its mounting upon said shaft but is free to swing with respect to said shaft. A lever 75, that is loosely mounted upon the shaft 73, carries a blade or knife 76. The upper end of the lever 75 carries a laterally extending plate 77, and a spring 78, which encircles a rod or bolt 79, bears between the plate 77, and the terminal end 80, of a lever 81; the lower end of which fits upon an angular portion 82, of shaft 73. Thus, when the lever 49, is moved, shaft 73, is rocked and the lever 81, imparts a cushioned thrust, through the medium of spring 78, to the plate carrying lever 75. This forces the plate inwardly and against the wires which constitute the connecting strands between two adjacent bundles and which wires extend diagonally across the face of a polished metal anvil disc 83, which is carried by the shaft 28. The lower end of the shaft 28, carries a gear wheel 84, which meshes with a gear wheel 85, that is fast upon the lower end of a vertical shaft 86. Shaft 86, carries an insulation removing disc 87. This disc is vertically notched to permit it to clear the bundles. The shaft 86, also carries pins 89, which serve to hold the wires against slipping as the knurled faces 87$^a$, of the disc 87, move into engagement with said wires. The removal of the insulation is effected by the crushing action of these knurled faces against the polished metal face of the anvil disc 83. A strap 90, carries a scraper plate 91, which acts against the face of the disc 87, and serves to scrape therefrom any accumulated insulating material. A scraper plate for removing any accumulated insulating material from the face of the disc 83, is illustrated at 92.

The degree of crushing to which the insulated wires may be subjected, in the removal of the insulation therefrom, may be varied by adjustment of bolts 93, the inner ends of which engage blocks 94, which constitute the bearings for the shaft 86, by which the crushing disc is carried. Springs 95, tend to move these blocks, and consequently the shaft and associated parts, away from disc 83. In carrying out the invention, I mount one or the other set of pins rigidly in their supporting disc and I pivotally mount the other set of pins in their supporting disc and provide means for holding the pivoted pin rigidly in place during the time that the wire is being wound thereon, said means being of a nature to release the pins after the winding of the wire thereon has been completed, thus relieving the tension upon the wire and permitting its ready removal by the operator.

Figure 8:
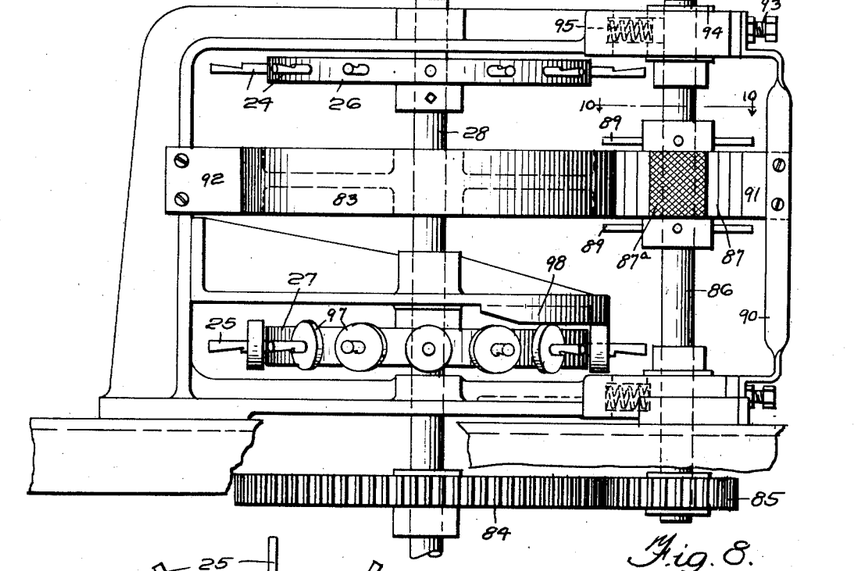
Fig. 8 is a side view of wire-supporting and insulation removing members, hereinafter described.
Figure 9:
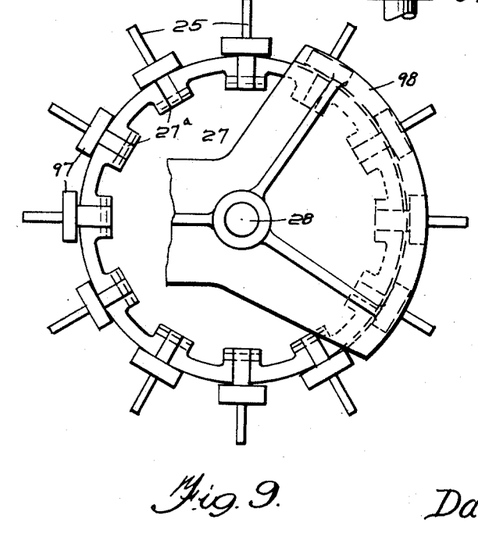
Fig. 9 is a fragmentary plan view of the structure illustrated in Fig. 8.
Figure 10:
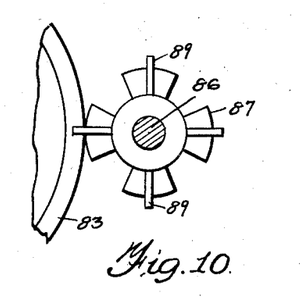
Fig. 10 is a plan view of the insulation removing elements, hereinafter described.

In the form illustrated in Fig. 8, the upper pins 24, are rigidly fixed to the supporting disc 26, while the lower pins are pivotally connected to disc 27, as indicated at 27$^a$. These lower pins carry rollers 97, which ride beneath a cam trackway 98, during the time that the wire is being wound upon the respective pins. After the winding has been completed and the turret in its travel reaches a point where the bundle is to be removed by the operator, the rollers ride from beneath the cam trackway 98, and permit the lower pins to move upwardly, thereby relieving the tension upon the wound bundle and permitting its ready removal.

Figure 11:
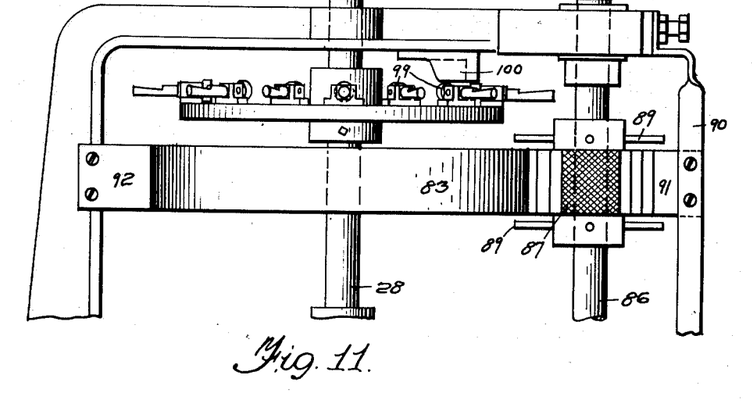
Fig. 11 is a view like Fig. 8 but showing a modification of the mechanism.
Figure 12:
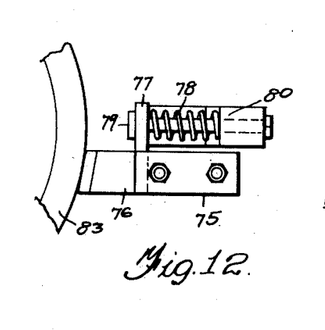
Fig. 12 is a detail view of the knife, hereinafter described.
Figure 13:
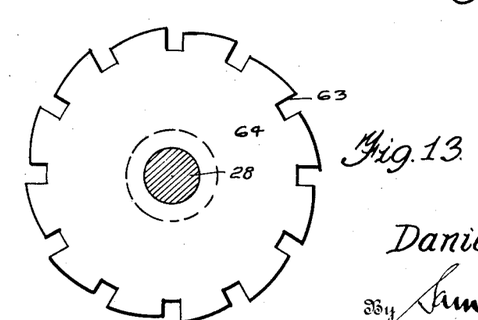
Fig. 13 is a detail plan view of a locking disc for locking the turret against movement during the winding operation, and, Fig. 14 is a detail view illustrating two of the wound bundles and the position of the connecting wire extending between them, prior to the time of action of the insulation removing disc and the knife, thereon.

In the form of the invention illustrated in Fig. 11, the structure is reversed with respect to the showing of Fig. 8. In other words, in this case, the upper pins are pivotally mounted and carry rollers 99, inwardly of their pivot points. These rollers ride beneath a cam trackway 100, which acts to hold the outer ends of the pins elevated during the winding of the wire thereon. At the point of removal of the bundles the cam trackway terminates and the pins are permitted to drop, thereby relieving the tension upon the bundles and permitting their ready removal.

Figure 14:
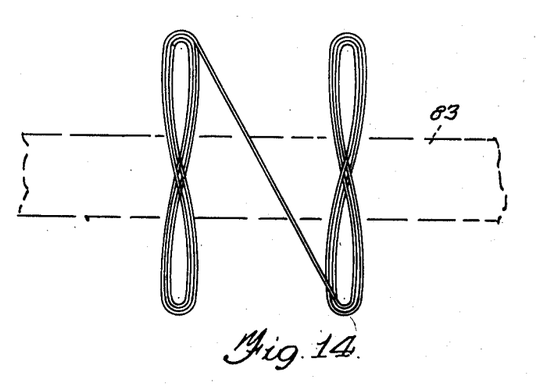

After the requisite amount of wire has been wound upon a pair of pins, the turret is stepped forward, the bundle clearing the disc 87 by passing through one of the vertical notches, therein. The connecting strands of wire leading from a wound bundle to another bundle extend obliquely across the face of the anvil disc 83, (see Fig. 14) and in its travel past and beneath the knurled faces 87$^a$, of disc 87, the insulation is crushed from the wires by said knurled faces. This leaves bared portions of the wire, which, when the turret is stepped ahead the next time, comes to rest in alignment with the blade or knife 76. This blade lies at such an angle that it will cut the wires at right angles to their length, or in other words, it will cut both wires the same length. The wires are not cut exactly at the center of the bared portions but are cut at one side of the center to leave about 2½ inches of exposed wire for the battery end and about ¼ of an inch of exposed wire for attachment to the detonator.

The disc, which carries the fixed pins, may be adjusted vertically with respect to the shaft 28, and thus the length of the bundle may be varied. I preferably provide a hand wheel 101, on shaft 33. Before latching the control handle, 104, of the change speed gearing, in adjusted position, to determine the number of wraps to the bundle, as previously described, this hand wheel is turned to a marked position, which is the same for all lengths of wire. The length of wire that is to be wrapped per minute may be varied by changing the ratio of the gearing between the motor and gear 13.

It is to be understood that the invention is not limited to the precise construction set forth but that it includes within its purview whatever changes fairly come within either the terms or the spirit of the appended claims.

Having described my invention, what I claim is:

1. A machine of the character described comprising a wire receiving support, a shuttle, a guide in which said shuttle is mounted, a reciprocatory connecting rod imparting vertical reciprocation to said shuttle along said guide, a cross-head, by which said guides are carried, a connecting rod for imparting horizontal reciprocation to said cross-head, outwardly bowed guides carried by and movable with the cross-head, and engaging a movable part of the shuttle to move said part outwardly with respect to the wire being wound, at substantially the central part of the vertical stroke of said shuttle.

2. A machine of the character described, having a turret comprising spaced pin carrying discs and an interposed anvil disc, a shuttle, means for causing the shuttle to describe a figure 8 path to wind wire in figure 8 form upon said pins, an insulation removing member coacting with the anvil disc and a knife coacting with the anvil disc.

3. A machine of the character described, comprising a turret, consisting of a vertical shaft, a pair of spaced pin-carrying discs, thereon, an anvil disc therebetween, a crushing disc and a shuttle reciprocable across the face of the anvil disc, said crushing disc being adapted to crush insulation from the wire when said wire passes between the crushing disc and the anvil disc.

4. A structure as recited in claim 3, in combination with a knife, beyond the crushing disc, for severing the wires.

5. A structure as recited in claim 3, in combination with a knife, beyond the crushing disc, coacting with the face of the anvil disc to sever the wires.

6. A structure as recited in claim 3, wherein the pins of one of said discs, are mounted to yield, and means for holding said pins rigid through a portion only of the travel of said discs.

7. In a machine of the character described, means for winding wire into bundles, in combination with a pair of discs arranged to crush the connecting strands between adjacent bundles, between them, for the purpose of removing the insulation therefrom.

8. A structure as recited in claim 7, in combination with means for scraping waste insulating material from said discs.

9. In a machine of the character described, the combination with means for winding wire in successive bundles, of means for removing insulation from the strands connecting said bundles, comprising a pair of discs mounted to rotate in contact with each other, one of said discs having a knurled face and pins rotating with the last named disc for preventing the wire from slipping out of contact therewith.

10. In a machine of the character described, means for winding wire in successive bundles, in combination with means for removing the insulation from the connecting strands between said bundles, said means comprising a pair of discs rotating in contact with each other, one of said discs having knurled faces and being provided with a vertical slot for the passage of the bundle therethrough.

11. In a machine of the character described, the combination with a rotating element, of a plurality of pins pivotally carried thereby and projecting radially therefrom, a cam trackway, means carried by said pins for engaging the cam trackway through a portion of the travel of said pins.

12. A machine of the character described, comprising a turret carrying a plurality of spaced, wire-receiving pins, arranged in pairs, a shuttle, mechanism for imparting a step by step turning movement to the turret and means for driving said actuating mechanism, comprising change speed elements, the adjustment of which determines the frequency with which the turret will be moved to thereby determine the number of wraps in a bundle.

13. A machine of the character described, comprising a turret carrying a plurality of pairs of spaced pins, a shuttle, means for vertically reciprocating said shuttle, guides for said shuttle, means for horizontally reciprocating the guides, whereby the shuttle is caused to describe a figure 8 path, a ratchet wheel carried by the turret, a pawl engaging the ratchet wheel, an actuating member for the pawl, means for periodically moving the actuating member and means for variably determining the time of such periodical actuation of the pawl.

14. A structure as recited in claim 13, in combination with a periodically actuated knife and an anvil disc constituting a part of the turret against which said knife acts.

15. A machine of the character described, comprising a turret, wire receiving members carried thereby, a pawl and ratchet mechanism for imparting a step by step movement thereto, an actuating lever for the pawl and ratchet mechanism, a continuously driven shaft, a sleeve splined upon said shaft, a spring tending to move said sleeve in one direction, a member carried by said sleeve adapted in its rotation to move the actuating lever of the turret, a detent for holding said sleeve in such position as to render it inoperative with respect to the operating lever of the turret, a rotative member, connections between said rotative member and the detent for releasing the same periodically, and a variable speed drive for said rotative member.

16. A structure as recited in claim 15, in combination with a knife and a member upon said sleeve, the revolution of which imparts movement to the actuating lever of said knife.

17. In a machine of the character described, in combination, a turret comprising a vertical shaft, carrying a pair of spaced, pin-carrying discs and an interposed anvil disc, a crushing disc mounted to rotate with its periphery close to the periphery of the anvil disc, means for driving the crushing disc from the vertical shaft, a knife movable toward and from the periphery of the anvil disc, a pair of actuating levers, one for the knife and the other for the vertical shaft, movement of the latter imparting a step by step movement to said vertical shaft, a continuously driven, rotative shaft, a sleeve splined thereon, members carried by said sleeve for striking against said levers to actuate the same during the rotation of said sleeve, a spring tending to shift said sleeve in a direction to bring said members into alignment with said levers, a detent resisting the movement of said sleeve and a variable speed member for periodically releasing said detent.

18. A structure as recited in claim 17, in combination with means operable once during each rotation of the sleeve, to move it endwise against the tension of said spring.

19. A structure as recited in claim 17, wherein the knife is in two parts, one of which is rigidly connected to its actuating lever and the other of which is yieldingly connected to the first named part.

20. A machine of the character described, comprising a turret consisting of a vertical shaft, a pair of spaced pin-carrying discs, an anvil disc between the pin-carrying discs, an insulation crushing disc, rotating in contact with the periphery of the anvil disc, a knife acting against the face of the anvil disc, a pawl and ratchet mechanism for imparting a step by step movement to the turret, a pair of levers, one of which actuates the pawl and ratchet mechanism and the other of which actuates the knife, a continuously driven shaft, a sleeve mounted for endwise movement upon said shaft and rotating therewith, elements carried by said sleeve and adapted to act upon said levers, once during each rotation of the sleeve, a spring tending to move said sleeve in a direction to bring said members into alignment with said levers, a detent, a member engaged with the sleeve and adapted to be engaged by said detent for holding the sleeve against movement under the influence of the spring to thereby hold the members of the sleeve out of alignment with the levers, a rotative element adapted to periodically actuate said detent, a change speed gearing for driving said rotative members, said change speed gearing in turn being driven from the continuously rotating shaft.

21. A structure as recited in claim 20, in combination with locking means for the turret.

22. A structure as recited in claim 20, in combination with locking means for the turret and means for releasing said locking means upon initial movement of the actuating lever of the turret.

23. A machine of the character described, comprising a turret and spaced wire supports carried thereby of means for imparting step by step movement thereto, consisting of a ratchet wheel carried by the turret, a locking disc carried by the turret, a slidable bar, a pawl carried by said slidable bar and engaging the ratchet wheel, a locking bar adapted to engage the locking disc and means supported from the slidable bar for withdrawing the locking bar upon initial movement of the slidable bar.

24. A structure as recited in claim 20, in combination with a laterally projecting element carried by the sleeve and a cam against which said element acts to shift the sleeve longitudinally against the tension of said spring.

25. A machine of the character described, comprising a pair of spaced pins, a shuttle, means for causing said shuttle to traverse a figure 8 path adjacent said pins to wind wire thereon, in the form of a figure 8 bundle, and means for mounting one of the pins of the pair in such manner as to permit it to bodily swing toward the other pin to release the bundle after the winding operation is completed.

26. A machine of the character described, comprising a pair of spaced strand receiving pins, a shuttle, means for causing said shuttle to traverse a figure 8 path, adjacent said pins, to wind the strand thereon, in the form of a figure 8 bundle, and means for laterally drawing a part of the shuttle away from the pins when the shuttle reaches that point in its travel where the strands cross each other.

27. A machine of the character described, comprising spaced strand receiving elements, a shuttle, a guide-way by which the shuttle is carried, means for reciprocating the shuttle longitudinally with respect to the guide-way, and means for bodily reciprocating the guide-way laterally, the movement of the shuttle and guide-way being in parallel vertical planes.

28. A structure as recited in claim 27, in combination with a turret by which the wire receiving elements are carried, and means for imparting step by step movement to said turret.

29. A machine of the character described, comprising a horizontally rotating turret, carrying a plurality of strand receiving elements arranged in pairs, means for imparting step by step movement to said turret, a shuttle, a guide-way in which said shuttle is mounted to travel vertically, means for moving the shuttle vertically in the guide-way, and means for moving the guide-way horizontally back and forth, as and for the purposes stated.

30. A structure as recited in claim 29, in combination with means for drawing a part of the shuttle away from the turret when the shuttle reaches that point in its travel at which the strands cross each other.

31. A machine of the character described, comprising a horizontally rotating turret, means for imparting step-by-step movement to said turret, a plurality of upper and lower wire receiving pins arranged in pairs, and means for releasing one of the pins of each pair at the completion of the winding operation.

32. A machine of the character described, comprising a horizontally rotating turret, means for imparting step-by-step movement to said turret, a plurality of upper and lower wire receiving pins arranged in pairs, means for releasing one of the pins of each pair at the completion of the winding operation, a shuttle, a vertical guide-way in which said shuttle is mounted to travel across the pins of a pair, and means for horizontally reciprocating the guide-way simultaneously with the vertical reciprocation of the shuttle therein.

In testimony whereof he affixes his signature.

DANIEL D. HUYETT.